US009093944B2

(12) United States Patent
Kim

(10) Patent No.: US 9,093,944 B2
(45) Date of Patent: Jul. 28, 2015

(54) METHOD FOR CONTROLLING PWM INVERTER BY COMPENSATING THE NUMBER OF PWM PULSES IN RESPONSE TO FREQUENCY CHANGE

(71) Applicant: LSIS CO., LTD., Anyang-si, Gyeonggi-do (KR)

(72) Inventor: Hee Sun Kim, Seoul (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 0 days.

(21) Appl. No.: 13/779,663

(22) Filed: Feb. 27, 2013

(65) Prior Publication Data
US 2013/0229845 A1 Sep. 5, 2013

(30) Foreign Application Priority Data
Mar. 2, 2012 (KR) .......................... 10-2012-0021639

(51) Int. Cl.
H02P 27/08 (2006.01)
H02P 23/00 (2006.01)
(52) U.S. Cl.
CPC ............ *H02P 27/08* (2013.01); *H02P 23/0086* (2013.01)
(58) Field of Classification Search
CPC ...................................................... H02P 27/08
USPC .............. 363/40, 41, 163, 165; 332/109, 117; 318/599, 603, 400.13, 400.17, 400.2
See application file for complete search history.

(56) References Cited

U.S. PATENT DOCUMENTS

| 4,802,077 | A * | 1/1989 | Fujii et al. ........................ 363/41 |
| 5,587,891 | A * | 12/1996 | Nakata et al. .................... 363/41 |
| 5,781,423 | A * | 7/1998 | Inarida et al. ................... 363/41 |
| 7,724,548 | B2 * | 5/2010 | Jones et al. ...................... 363/37 |
| 2006/0049792 | A1 * | 3/2006 | Chen et al. ...................... 318/716 |
| 2007/0091653 | A1 * | 4/2007 | Leggate et al. ................. 363/41 |
| 2010/0109583 | A1 * | 5/2010 | Maekawa et al. ......... 318/400.02 |
| 2010/0164418 | A1 * | 7/2010 | Higuchi .................... 318/400.26 |
| 2011/0166736 | A1 * | 7/2011 | Kitanaka ......................... 701/22 |
| 2011/0175558 | A1 * | 7/2011 | Kitanaka ................... 318/400.3 |
| 2012/0140524 | A1 * | 6/2012 | Manabe et al. ................. 363/17 |

FOREIGN PATENT DOCUMENTS

| CN | 88103301 | 12/1988 |
| CN | 1744421 | 3/2006 |
| JP | 10-075586 | 3/1998 |

(Continued)

OTHER PUBLICATIONS

Fujita, et al., "Instantaneous Speed Detection with Parameter Identification for ac Servo Systems," IEEE Transactions on Industry Applications, vol. 28, No. 4, Jul. 1992, pp. 864-872.
Korean Intellectual Property Office Application Serial No. 10-2012-0021639, Office Action dated Apr. 3, 2013, 3 pages.
Japan Patent Office Application Serial No. 2013-040846, Office Action dated Feb. 18, 2014, 2 pages.
The State Intellectual Property Office of the People's Republic of China Application Serial No. 201310067970.9, Office Action dated Dec. 1, 2014, 7 pages.

(Continued)

*Primary Examiner* — Emily P Pham
(74) *Attorney, Agent, or Firm* — Lee, Hong, Degerman, Kang & Waimey

(57) ABSTRACT

Disclosed is a method for controlling an inverter, the method including, calculating the number of PWM pulses from a current frequency of the inverter, compensating the number of PWM pulses using a predetermined number of pulses when the number of PWM pulses is less than the predetermined number of pulses, and calculating a new frequency of the inverter using the compensated number of PWM pulses.

2 Claims, 3 Drawing Sheets

(56) References Cited

FOREIGN PATENT DOCUMENTS

| | | |
|---|---|---|
| JP | 2004-274905 | 9/2004 |
| JP | 4062949 | 3/2008 |
| JP | 2009-284598 | 12/2009 |
| WO | 2009/040884 | 4/2009 |

OTHER PUBLICATIONS

Japan Patent Office Application Serial No. 2013-040846, Office Action dated Jan. 14, 2015, 3 pages.

* cited by examiner

METHOD FOR CONTROLLING PWM INVERTER BY COMPENSATING THE NUMBER OF PWM PULSES IN RESPONSE TO FREQUENCY CHANGE

CROSS-REFERENCE TO RELATED APPLICATIONS

Pursuant to 35 U.S.C. §119 (a), this application claims the benefit of earlier filing date and right of priority to Korean Patent Application No. 10-2012-0021639, filed on Mar. 2, 2012, the contents of which are hereby incorporated by reference herein in their entirety.

BACKGROUND OF THE DISCLOSURE

1. Field of Endeavor

The present disclosure relates to a method for controlling an inverter.

2. Background

This section provides background information related to the present disclosure which is not necessarily prior art.

In general, a motor is used for driving a turbo machine. Revolution of a motor is in proportion to a frequency of a supplied power, and in reverse proportion to the number of poles, such that a maximum revolution cannot exceed 3,600 rpm for a two-poled motor. A mechanical step-up gearbox is needed to obtain a speed higher than the 3,600 rpm. However, in case of using the gearbox, cost disadvantageously increases and a machined efficiency decreases due to mechanical friction loss.

Thus, in order to solve the aforementioned disadvantages, a high-speed motor capable of obtaining a high efficiency at a high speed is recently used, and in order to increase revolution of the high speed motor, a technique to increase a motor speed up to several ten thousands of rpm has been commercialized.

FIG. 1 is a schematic configuration of a motor system controlled by a conventional inverter. Referring to FIG. 1, a motor system includes an AC (Alternating Current) power source (1), an inverter (2) controlling a motor (3), the motor (3) and a load (4).

The inverter (2) includes a converter (21) converting an AC power source to a DC power source, an initial charging resistor (22) preventing inflow of inrush current in a case a power source is inputted, a switch (23) separating the initial charging resistor (22) from a circuit after the inrush current is prevented, a capacitor (24) smoothing a DC voltage, a PWM (Pulse Width Modulation) inverter unit (25) formed with a plurality of switching devices to convert a DC current to an AC current, a current detection unit (26) detecting a current flowing in U, V and W phase, a controller (27) collecting various information including a DC voltage and a phase current of the inverter (2), and a PWM controller (28) generating a PWM signal using a voltage command V* inputted from the controller (27) and a frequency command f* and applying a switching signal to a switching device of each phase of the PWM inverter unit (25).

The load (4) is driven by the motor (3), where the load (4) receives a load amount and transmits the load amount to the controller (27). The inverter (2) of FIG. 1 receives a power of the AC power source (1), converts the voltage and the frequency through a power conversion and supplies the converted voltage and frequency to the motor (3), whereby speed and torque of the motor (3) can be controlled at a high efficiency. As noted above, accurate control of motor speed can realize energy saving and quality improvement, such that the inverter (2) is widely used in automotive facilities including various blowers, pumps, machine tools and textile machines.

Generally, a Sinusoidal PWM (SPWM) control is widely used for a PWM controller (28) of FIG. 1 to generate a PWM signal. In SPWM control, an output signal is outputted by comparing a sinusoidal reference signal with a triangular (saw-tooth) wave carrier. In a case of a slow speed inverter (60 Hz or less), an inverter can be operated using asynchronous SPWM without any great change in the number of pulses.

However, a high speed inverter suffers from a disadvantage in that the number of PWM pulses is greatly changed in response to a high speed change (several kHz) in inverter operation frequency. In a case there is a great change in the number of PWM pulses, the high speed inverter fails to receive a predetermined output current, disadvantageously making it impossible to obtain a stable inverter output due to increase in pulsation of output current.

Thus, there is a need to provide a method for controlling an inverter capable of solving the aforementioned disadvantages or problems.

SUMMARY OF THE DISCLOSURE

This section provides a general summary of the disclosure, and is not a comprehensive disclosure of its full scope or all of its features.

Methods and systems consistent with the present disclosure provide a method for controlling an inverter configured to obtain a stable output current in a high speed inverter by performing a synchronous PWM control.

It should be emphasized, however, that the present disclosure is not limited to a particular disclosure as explained above. It should be understood that other technical subjects not mentioned herein may be appreciated by those skilled in the art.

In one general aspect of the present disclosure, there is provided a method for controlling an inverter, the method comprising: calculating the number of PWM pulses from a current frequency of the inverter; compensating the number of PWM pulses using a predetermined number of pulses when the number of PWM pulses is less than the predetermined number of pulses; and calculating a new frequency of the inverter using the compensated number of PWM pulses.

Preferably, but not necessarily, the method may further comprise outputting a PWM pulse in response to the new frequency.

Preferably, but not necessarily, the PWM pulse outputted by the new frequency is a synchronous PWM pulse.

Preferably, but not necessarily, the method may further comprise performing asynchronous PWM control when the inverter is under a slow speed operation mode.

Preferably, but not necessarily, the method may further comprise performing asynchronous PWM control when the inverter is under asynchronous PWM operation mode.

The method for controlling an inverter according to exemplary embodiments of the present disclosure has an advantageous effect in that the number of PWM output pulses is so controlled as to allow the PWM output pulses to synchronize in symmetrical manner, to thereby obtain a distortion-free stable output current during a high speed operation of an inverter.

BRIEF DESCRIPTION OF THE DRAWINGS

In order to explain the principle of the present disclosure, some accompanying drawings related to its preferred embodiments are below reported for the purpose of illustration, exemplification and description, although they are not intended to be exhaustive. The drawing figures depict one or more exemplary embodiments in accord with the present concepts, by way of example only, not by way of limitations. In the figures, like reference numerals refer to the same or similar elements.

Thus, a wide variety of potential practical and useful embodiments will be more readily understood through the following detailed description of certain exemplary embodiments, with reference to the accompanying exemplary drawings in which.

DETAILED DESCRIPTION

Features and advantages of the disclosed embodiments will be or will become apparent to one of ordinary skill in the art upon examination of the following figures and detailed description. It is intended that all such additional features and advantages be included within the scope of the disclosed embodiments, and protected by the accompanying drawings. Further, the illustrated figures are only exemplary and not intended to assert or imply any limitation with regard to the environment, architecture, or process in which different embodiments may be implemented. Accordingly, the described aspect is intended to embrace all such alterations, modifications, and variations that fall within the scope and novel idea of the present invention.

The method for controlling an inverter according to the present disclosure is applicable to cases where the inverter is operated, whose rated speed reaches several thousand rpm and whose operation frequency reaches several kHz, as in high speed blowers and high speed refrigerators. The present disclosure performs a symmetric PWM control during an inverter PWM control to stabilize an inverter output current during high speed switching in response to increase in operation frequency.

Figure 1:
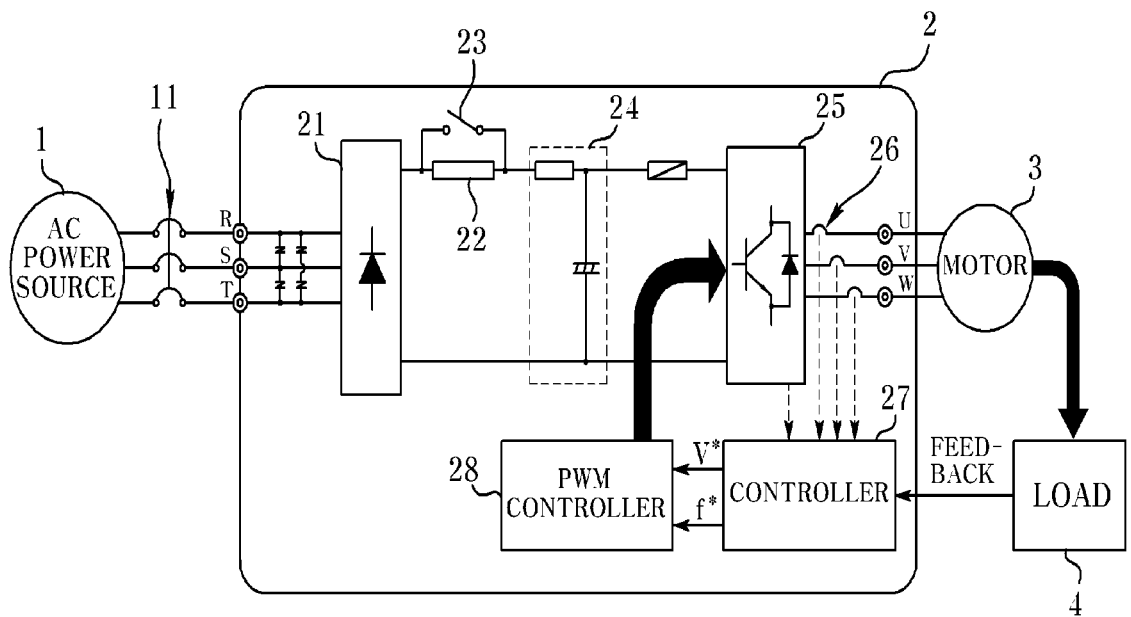
FIG. 1 is a schematic block diagram illustrating a motor system controlled by a motor according to prior art.

The method for controlling an inverter according to the present disclosure is applicable to an inverter system as shown in FIG. 1, and particularly to a control of a PWM controller (28).

Now, exemplary embodiments of the present disclosure will be illustrated in detail with reference to the accompanying drawings.

Figure 2:
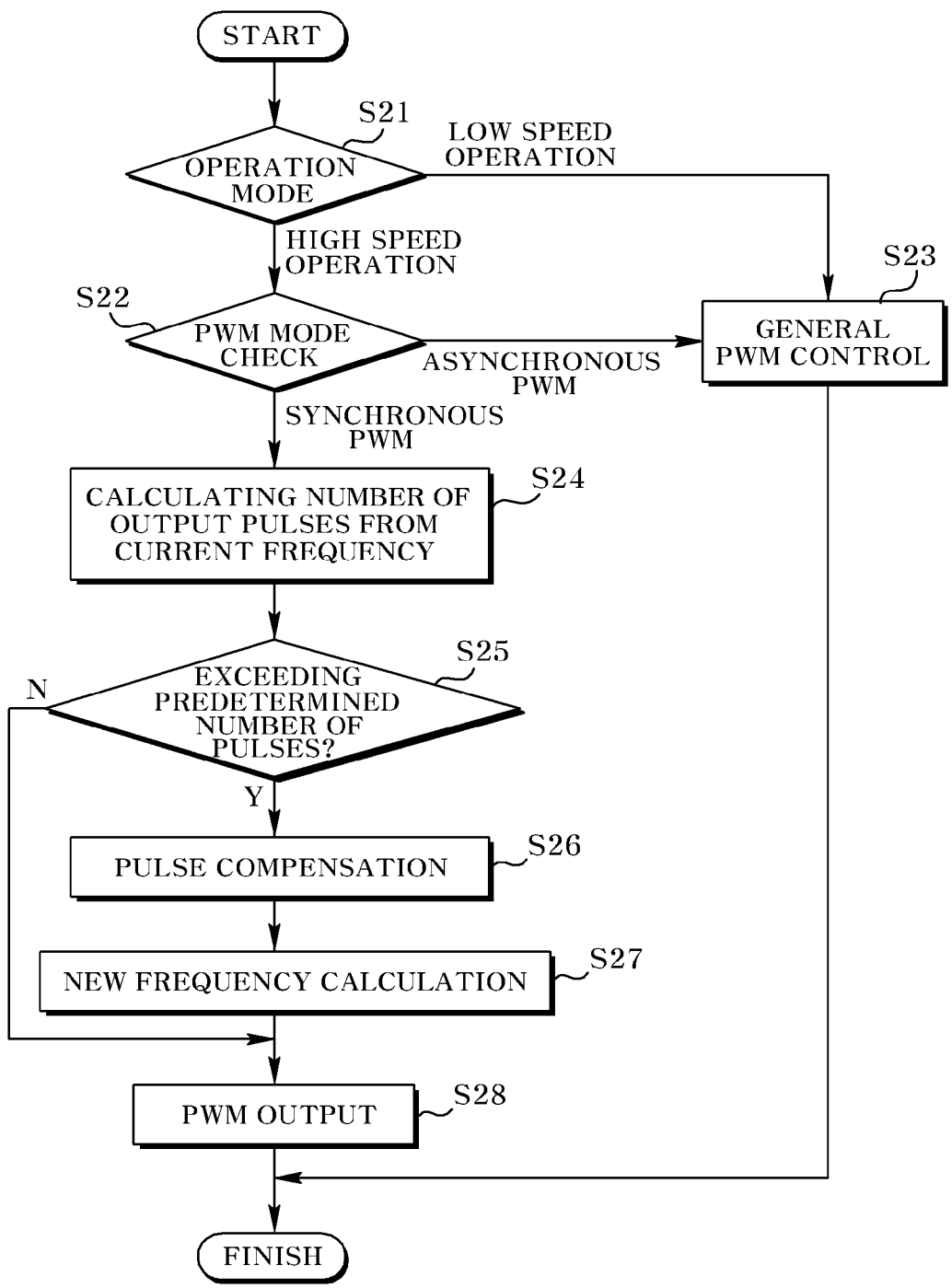
FIG. 2 is a flowchart illustrating a method for an inverter according to the present disclosure.

FIG. 2 is a flowchart illustrating a method for an inverter according to the present disclosure.

Referring to FIG. 2, the method for controlling an inverter according to the present disclosure is to check an operation mode of an inverter (S21), and to perform an asymmetrical PWM control for a low speed operation (S23). In the asymmetrical PWM control, a sinusoidal reference signal and a triangular carrier are compared to output an output voltage.

In case of an inverter requiring a high speed operation at S21, the PWM controller (28) checks a predetermined PWM mode (S22). To this end, the inverter may designate and store whether to operate under a synchronous PWM mode or under an asynchronous PWM mode in response to a user designation.

In case of the predetermined PWM mode being an asynchronous PWM mode at S22, the PWM controller (28) performs an asynchronous PWM control (S23), and performs a synchronous PWM control, in case of the predetermined PWM mode being a synchronous PWM mode.

The PWM controller (28) calculates the number of PWM pulses based on a current output frequency of the inverter (S24).

The PWM controller (28) compensates the number of PWM pulses using a predetermined number of pulses (S26) when the number of PWM pulses calculated at S24 is less than the predetermined number of pulses.

The PWM controller (28) now calculates a new output frequency (S27) using the compensated number of PWM pulses, and outputs a PWM pulse using the calculated new frequency (S28).

Now, an operation of method for controlling an inverter according to an exemplary embodiment of the present disclosure will be illustrated in detail with reference to FIG. 3.

Figure 3:
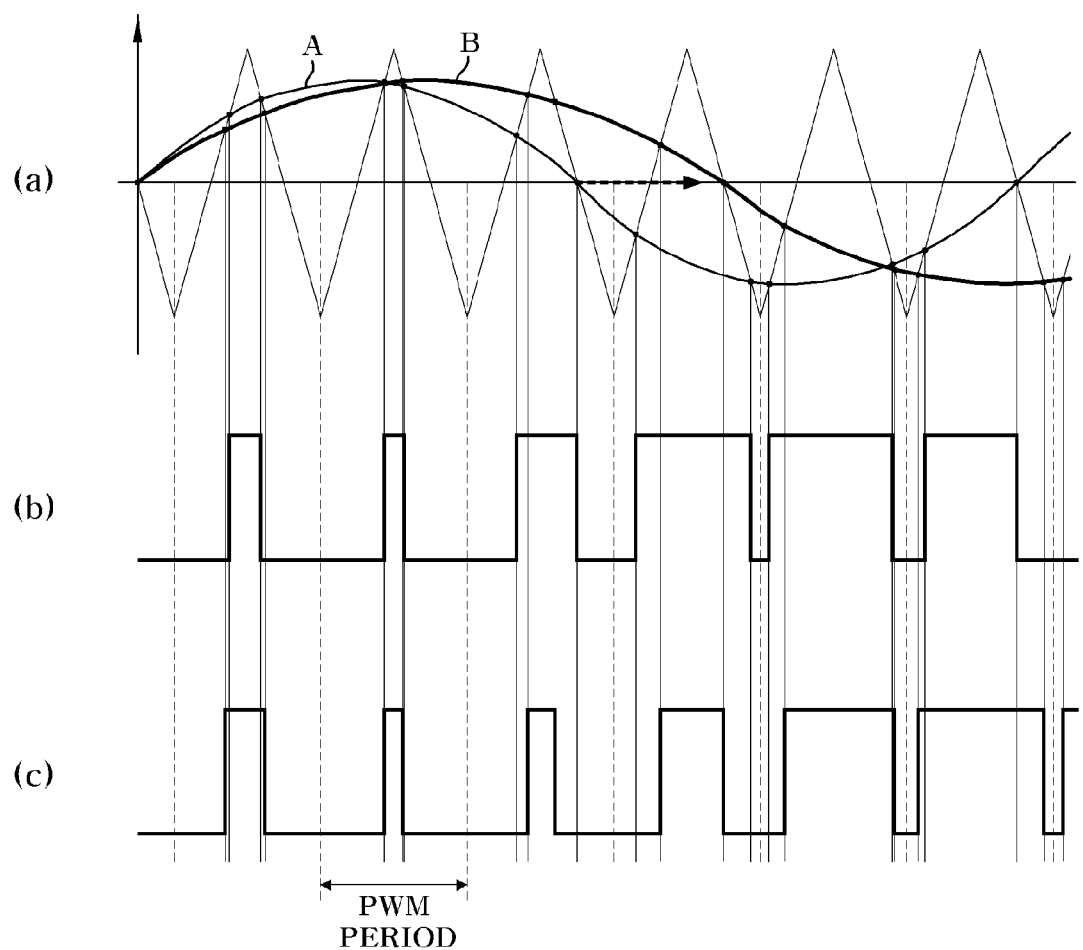
FIG. 3 is a graph illustrating a synchronous PWM control according to the present disclosure.

FIG. 3 is a graph illustrating a synchronous PWM control according to the present disclosure, where (a) defines a relationship between a sinusoidal reference signal and a triangular carrier, (b) defines a PWM pulse outputted by a conventional sinusoidal reference signal (A), and (c) defines a PWM pulse outputted by a sinusoidal reference signal (B) compensated in terms of the number of PWM pulses according to the present disclosure.

Referring to FIG. 3, the number of PWM pulses is greatly changed by changes in rapidly-changing frequency during high speed operation of an inverter, and an output waveform is greatly influenced by increase and decrease in the number of PWM pulses.

Thus, the PWM controller (28) according to the present disclosure calculates a PWM pulse of a currently operated inverter, compensates a value of the calculated PWM pulse, in a case the number of PWM pulses is less than a predetermined number of pulses, and controls a synchronous PWM by changing an operation frequency of the inverter.

It can be noted that, in a case an operation frequency of 'A' {asynchronous PWM pulse of FIG. 3(b)} outputting an asynchronous PWM pulse is changed to a frequency as 'B' in FIG. 3(a), a synchronous PWM pulse is outputted as shown in FIG. 3(c). It can be also noted that the number of PWM pulses outputted for a period is also increased by changes in operation frequency from A to B.

As apparent from the foregoing, a distortion-free stable output current can be obtained during high speed operation of an inverter by controlling the number of PWM pulses by allowing the PWM pulses to be symmetrically synchronized.

Although the present disclosure has been described with reference to a number of illustrative embodiments thereof, it should be understood that numerous other modifications and embodiments can be devised by those skilled in the art that will fall within the spirit and scope of the principles of this disclosure.

More particularly, various variations and modifications are possible in the component parts and/or arrangements of subject combination arrangement within the scope of the disclosure, the drawings and the appended claims. In addition to variations and modifications in the component parts and/or arrangements, alternative uses will also be apparent to those skilled in the art.

What is claimed is:

1. A method for controlling an inverter, the method comprising:
   determining an operation mode of the inverter;
   performing an asynchronous pulse width modulation (PWM) control if the determined operation mode is a low speed operation;

determining a predetermined PWM mode if the operation mode is a high speed operation and performing synchronous PWM control if the predetermined PWM mode is synchronous, wherein performing asynchronous PWM control comprises:

calculating a number of PWM pulses based on a current frequency of the inverter;

changing the number of PWM pulses to a predetermined number if the calculated number is less than the predetermined number;

determining a new frequency of the inverter using the predetermined number of PWM pulses; and outputting a synchronous PWM pulse in response to the new frequency.

2. The method of claim 1, further comprising:

performing asynchronous PWM control if the predetermined PWM mode is asynchronous.

* * * * *